United States Patent [19]
Lambo

[11] 3,821,514
[45] June 28, 1974

[54] DEVICE FOR WARMING AQUARIUM WATER

[75] Inventor: Claude Lambo, Deurne, Belgium

[73] Assignee: APA Manufacturing N.V.

[22] Filed: Feb. 21, 1973

[21] Appl. No.: 334,359

[30] Foreign Application Priority Data
Feb. 28, 1972 Belgium .................................. 51697
Feb. 13, 1973 Belgium .................................. 52520

[52] U.S. Cl. ................... 219/296, 119/5, 240/2 LC
[51] Int. Cl. ................................................ F24h 1/00
[58] Field of Search ............ 119/5; 240/2 LC, 2 LF, 240/47, 209; 219/296, 202, 38

[56] References Cited
UNITED STATES PATENTS
1,803,571   5/1931   Ulman ............................. 240/2 LC
2,427,713   9/1947   Caldwell ......................... 219/209 X
3,418,450  12/1968   Schott ............................. 219/202 X
3,515,097   6/1970   Sherman ............................... 119/5
3,517,162   6/1970   Webb .............................. 219/381 X
3,594,568   7/1971   Guth ................................ 240/47 X
3,731,090   5/1973   Veloz ................................. 119/5 X Primary Examiner—J. V. Truhe
Assistant Examiner—Clifford C. Shaw

[57] ABSTRACT

The aquarium comprises at least a filter, a gas discharge tube for lighting the aquarium, a load resistance for this tube, a water tight and electrically insulated casing in which aforesaid load resistance is housed, whereby the outlet of aforesaid filter is directed upon the housing, which is heated by the load resistance, for the purpose of heating this water which flows over it from aforesaid outlet into the aquarium.

4 Claims, 3 Drawing Figures

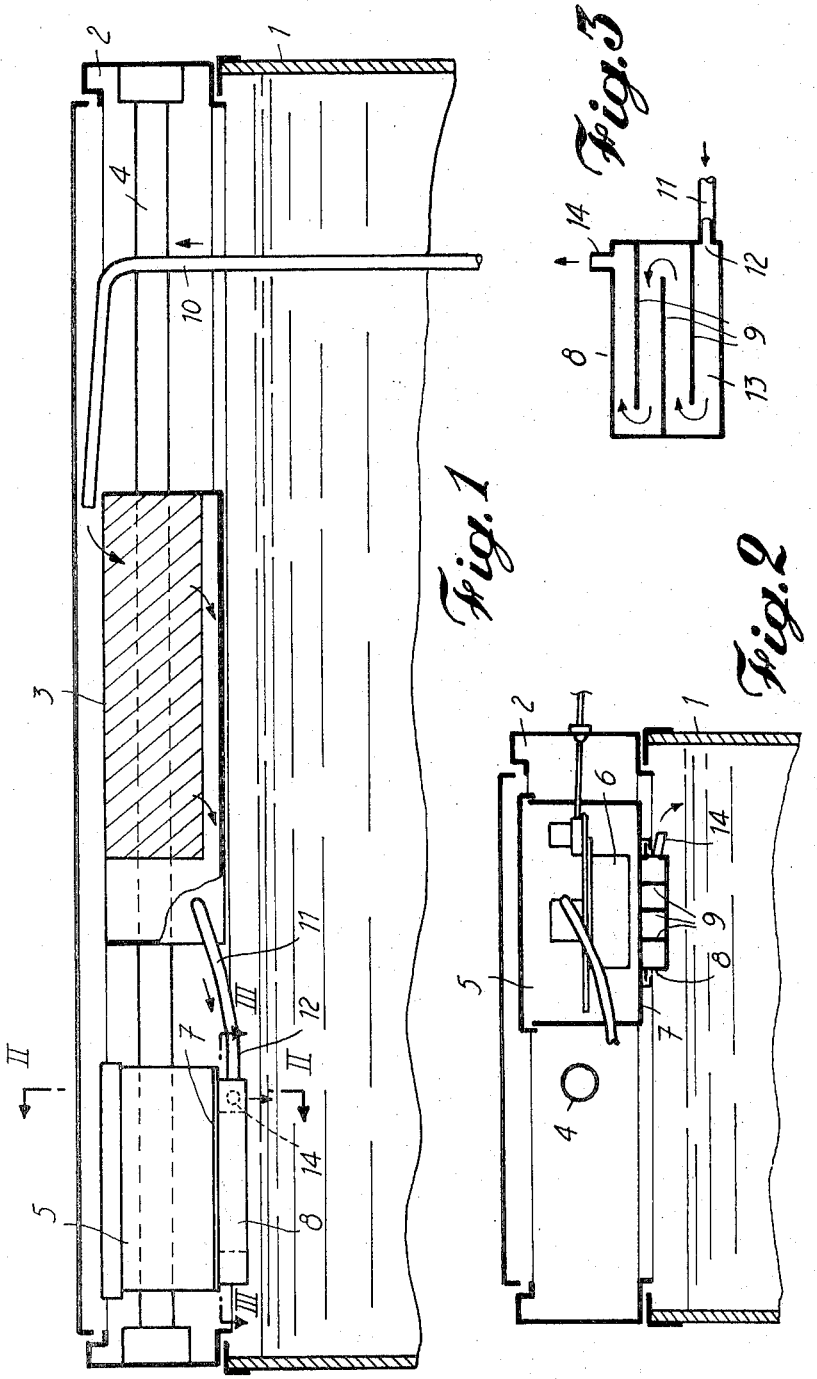

DEVICE FOR WARMING AQUARIUM WATER

The present invention is concerned with a device for the economical and efficient preheating of the water flowing out of a filter into an aquarium.

This invention is applicable mainly in the case of aquariums which are lighted by means gas discharge lamps and are fitted with a filter, in which case the load resistance for aforesaid lamp is contained in an electrically insulated and water tight casing. The main heating of the water for aquariums of this sort is moreover provided by means of a heating element.

The purpose of this invention is to reduce to a minimum the electric power consumption of said heating element and in many cases even to make the latter entirely superfluous.

For this purpose and according to the main characteristic of the present invention, the output of the filter is directed upon the casing which is heated by means of the loading resistances, so that the water which flows over the latter is heated when it reaches the aquarium. In order to obtain an efficient heating, the heating surface of aforesaid casing has been increased as can be understood from the description hereinafter.

Merely as an example, and without the slightest intent of limitation, a more detailed description shall be given below of a chosen form of embodiment of the device according to the present invention. This description refers to the appended drawings in which:

FIG. 1 represents a longitudinal section of the top part of an aquarium;

FIG. 2 shows a cross section of the top part of an aquarium and such according to line II—II of FIG. 1;

FIG. 3 represents a horizontal section of the device according to line III—III of FIG. 1.

The top of aquarium 1 is provided with a removable cover 2 in which a filter 3, a neon tube 4 and a load resistance 6 for said tube fitted in a water tight and electrically insulated casing 5 are suspended. An eventually removable closed chamber 8 is mounted below the bottom 7 of casing 5. This chamber is fitted with webs or partitions 9 in zig-zag form (see FIG. 3) attached in such a manner to aforesaid bottom 7 that all the heat absorbed by casing 5 is transmitted to these partitions 9. The water which enters filter 3 by way of siphon 10 leaves filter 3 in filtered condition via hose 11 the outlet 12 of which enters closed chamber 8 at one end of the zig-zag channel 13 formed by partitions 9, whereas chamber 8 is provided at the other extremity of aforesaid channel 13 with an outlet 14 by means of which the water flows into the aquarium. Consequently, the water which flows out of the filter forcibly follows a relatively long path along which it is sufficiently preheated by partitions 9 and thus reaches aquarium 1 at a suitable temperature. In many cases this heating will be sufficient or almost sufficient, so that the electrical consumption of a known type of heating element fitted in the aquarium will be reduced to a minimum and that in many cases such an element will even be superfuous.

It is perfectly evident that the dimensions, the shape and the materials of the device described above may vary according to the purpose pursued and that one or more of the previously described elements could be replaced by others which fulfill the same purpose. It would for instance be possible to preheat the water by making use, instead of closed chamber 8, merely of two fins fitted to and protruding from the bottom of the casing, between which the outlet of hose 11 would be led.

I claim:

1. A device for heating water in an aquarium comprising a water filter having an outlet, means for supplying water to said filter, a gas discharge tube capable of lighting the aquarium, a load resistance, an electrical circuit including said tube and resistance, a water tight and electrically insulated casing housing said resistance and means capable of being mounted on the top of the aquarium and supporting said tube, filter and said casing with said filter outlet positioned for directing water from said filter upon said casing which is heated by said resistance whereby the water from said filter outlet passing over said casing is heated before flowing therefrom.

2. A device as claimed in claim 1 including a plurality of protruding elements in contact with said casing and said filter outlet is positioned for directing the water between said protruding elements.

3. A device as claimed in claim 2 including a closed chamber connected to said casing, said protruding elements being partitions positoned in a zig-zag manner inside said chamber and being in contact with said casing providing a zig-zag channel, means connecting said filter outlet to one end of said channel and said chamber having a water outlet at the other end of said channel.

4. A device as claimed in claim 3 wherein said chamber is detachably mounted on said casing.